(12) United States Patent
Coman et al.

(10) Patent No.: US 11,342,102 B2
(45) Date of Patent: May 24, 2022

(54) MAGNETIC CENTER CHECK ATTACHMENT

(71) Applicants: Ronald E. Coman, Brighton, MI (US); Clarence Martin, Bloomfield Township, MI (US)

(72) Inventors: Ronald E. Coman, Brighton, MI (US); Clarence Martin, Bloomfield Township, MI (US)

( * ) Notice: Subject to any disclaimer, the term of this patent is extended or adjusted under 35 U.S.C. 154(b) by 0 days.

(21) Appl. No.: 16/860,427

(22) Filed: Apr. 28, 2020

(65) Prior Publication Data

US 2020/0343031 A1 Oct. 29, 2020

Related U.S. Application Data

(60) Provisional application No. 62/839,710, filed on Apr. 28, 2019.

(51) Int. Cl.
*H01F 7/00* (2006.01)
*B60R 13/02* (2006.01)
*H01F 7/02* (2006.01)

(52) U.S. Cl.
CPC ............ *H01F 7/02* (2013.01); *B60R 13/0206* (2013.01); *B60R 13/0212* (2013.01)

(58) Field of Classification Search
CPC ............ B60R 13/0206; B60R 13/0212; B60R 13/2018; H01F 7/02; H01F 7/0252; Y10T 24/32; A44D 2203/00
USPC .................................. 296/214, 39.1; 24/303
See application file for complete search history.

(56) References Cited

U.S. PATENT DOCUMENTS

| 9,956,926 | B2* | 5/2018 | Iriarte Jimenez ... B60R 13/0206 |
| 2006/0127172 | A1* | 6/2006 | Tisol .......................... F16B 2/20 403/410 |
| 2011/0140474 | A1* | 6/2011 | Smith ..................... B62D 27/06 296/35.1 |
| 2013/0305497 | A1* | 11/2013 | Coman .................. B62D 27/06 24/303 |
| 2014/0001321 | A1* | 1/2014 | Huelke ............... B60R 13/0212 248/206.5 |
| 2014/0001322 | A1* | 1/2014 | Joyce ..................... B62D 25/06 248/206.5 |

(Continued)

FOREIGN PATENT DOCUMENTS

| DE | 202013102698 U1 * | 7/2013 | ......... B60R 13/0206 |
| DE | 202015104697 U1 * | 10/2015 | ........... H01F 7/0252 |

(Continued)

*Primary Examiner* — Dennis H Pedder
(74) *Attorney, Agent, or Firm* — Reising Ethington P.C.

(57) ABSTRACT

An attachment mechanism adapted for use to connect a vehicle headliner with a vehicle header is provided. The attachment mechanism includes a locating block that is adapted to be inserted into an opening in the header of a vehicle. The attachment mechanism includes a base member that devises a center portion and a pair of troughs adjacent the edges of the center portion. The locating block extends from the center portion of the base member. The attachment mechanism includes a plurality of magnets disposed in the troughs and adapted to connect with the header of the vehicle. The attachment mechanism connects to a center check and is helpful in installing the center check with the opening in the vehicle's header.

9 Claims, 4 Drawing Sheets

(56) References Cited

U.S. PATENT DOCUMENTS

| | | | |
|---|---|---|---|
| 2016/0068117 A1* | 3/2016 | Huelke | B60R 13/0212 |
| | | | 24/303 |
| 2018/0211752 A1* | 7/2018 | Villacres Mesias | H01F 7/06 |
| 2019/0271343 A1* | 9/2019 | Perez Hernandez | B62D 27/06 |

FOREIGN PATENT DOCUMENTS

| | | | | |
|---|---|---|---|---|
| DE | 202015104351 U1 * | 1/2016 | | B60R 13/0206 |
| DE | 102016100762 A1 * | 7/2016 | | F16B 5/065 |

* cited by examiner

MAGNETIC CENTER CHECK ATTACHMENT

CROSS REFERENCE TO RELATED APPLICATION

This application claims the benefit of U.S. Provisional Application No. 62/839,710 filed Apr. 28, 2019 which is herein incorporated by reference in its entirety.

FIELD OF THE INVENTION

The present invention relates generally to a magnetic attachment mechanism that can be used to connect with a sun visor clip, also called a center check, to assemble headliners into vehicles.

BACKGROUND OF THE INVENTION

A sun visor clip, also called a center check, is commonly used as a 4-way locator, when combined with a high retention clip, to assemble headliners into vehicles. The 4-way locator, or center check, is the first locating feature that must be installed in the vehicle to properly orient the headliner in the vehicle in both the side-to-side and fore and aft directions. In other words, the primary 4-way locator must be installed first when installing a headliner because the remainder of the installation of the headliner is based on the position of the center check. Currently the 4-way locator or center check is most commonly secured to the vehicle header using high retention clips. These are metal clips that are installed into a hole by striking them with an appropriate tool, i.e. impacting them, to depress retention tabs that lock into place after installation. The force required to install most high retention clips is generally 20 to 40 lbs. The force required to remove a high retention clip is generally more than 150 lbs.

The installation process of the 4-way locator using high retention fasteners has certain drawbacks. The installation is difficult to perform, causes operator fatigue and is the source of many operator complaints. An installer that is installing the high retention fastener must hold up the weight of the headliner while searching also to align the high retention fastener with the hole in the front header of the vehicle. Once the fastener and hole are aligned, the installer needs to raise the headliner so the two features continue to stay aligned. While continuing to hold the headliner aligned in the hole with one arm, the installer needs to impact the center check with the other hand using a tool and applying approximately 20-40 lbs. of force. All of this is performed while the operator stands outside of the vehicle and reaches into the vehicle through the door opening. Thus, the operator's arms are fully extended while he or she performs the tasks of holding up the headliner, aligning the 4-way locater with the hole in the vehicle header, raising the headliner into the hole so it remains aligned and then impacting the headliner at the proper location to install the high retention fastener. This is a very strenuous and difficult operation to perform for an eight-hour shift on an assembly line.

It would be desirable to provide a device that overcomes at least some of the deficiencies of the prior installation method as discussed above.

SUMMARY OF THE INVENTION

According to an embodiment, there is provided an attachment mechanism adapted for use to connect a vehicle headliner with a vehicle header. The attachment mechanism comprises a locating block adapted to be inserted into an opening in the header of a vehicle. The attachment mechanism further comprises a base member defining a center portion and at least one trough adjacent an edge of the center portion. The locating block extends from the center portion of the base member. The attachment mechanism further comprises at least one magnet disposed in the trough and adapted to connect with the header of the vehicle. The locating block is adapted to position the attachment mechanism relative to the header and the magnet is adapted to retain the locating block and base member in position on the header.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a cross-sectional view of an embodiment of the attachment mechanism coupled with a center check; and.

DETAILED DESCRIPTION OF THE PREFERRED EMBODIMENTS

Figure 1:
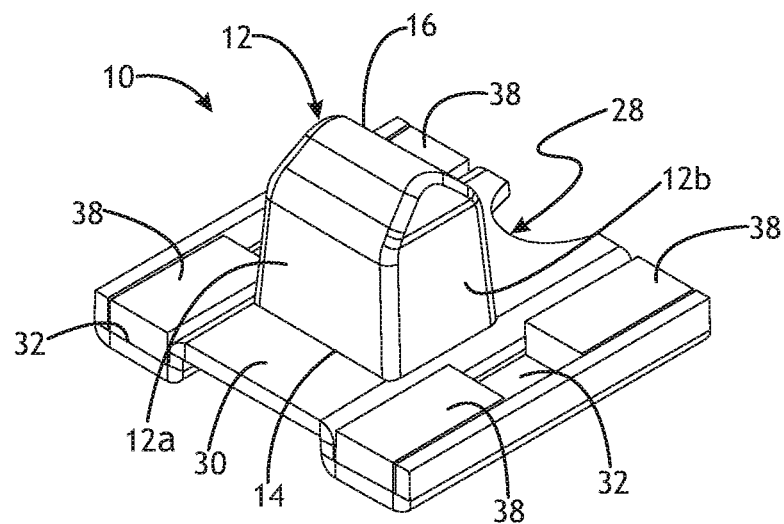
FIG. 1 is a perspective view of an embodiment.

The following description of the preferred embodiment(s) is merely exemplary in nature and is in no way intended to limit the invention, its application, or its uses.

An embodiment of an attachment mechanism is generally shown at 10. The attachment mechanism 10 is adapted for use to connect a vehicle headliner with a vehicle header (not shown). The attachment mechanism 10 comprises a locating block generally indicated at 12 adapted to be inserted into an opening (not shown) in the header of a vehicle. The header is typically made of metal. The locating block 12 includes four sides 12a, 12b, 12c, and 12d. The locating block 12 extends from a first end 14 to a second end 16 each of the sides 12a-d tapers at the second end of the locating block 12. The tapering of each of the sides 12a-d provides a lead-in to make it easier for the operator to locate the hole in the header. That is the tapering of the sides 12a-d helps guide the locating block 12 into the hole in the vehicle header. This is helpful because in one preferred embodiment, the locating block is sized so as to fit into a square hole in the header with minimal clearance (generally less than 2 mm) when the attachment mechanism 10 is fully engaged. In one embodiment, the locating block 12 is made of Acetal plastic. It will be appreciated that the locating block may be sized to any suitable dimension and may comprise any suitable material. The locating block 12 is designed to withstand large forces (generally in the range of 100-200 lbs.) in the fore-aft or longitudinal direction of a base member 28.

Figure 3:
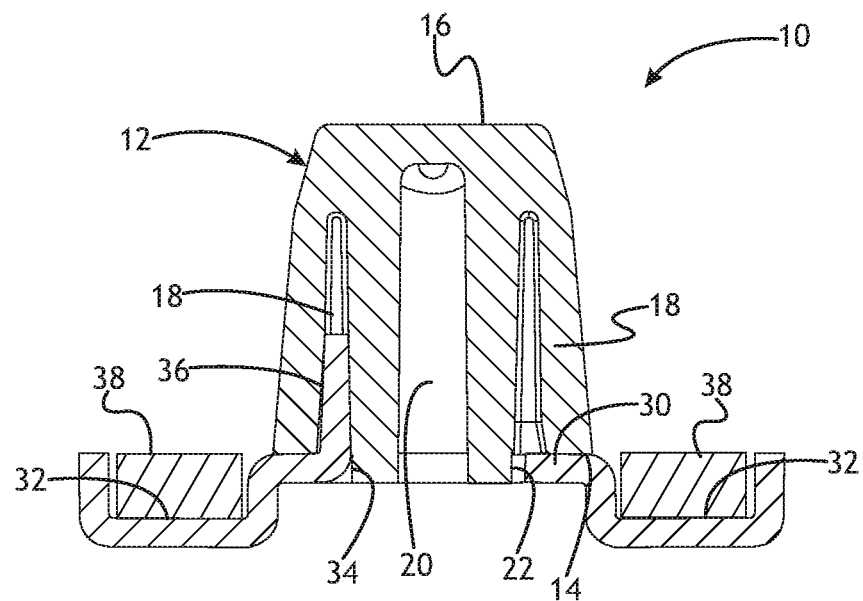
FIG. 3 is a cross sectional view of the embodiment of FIG. 1.
Figure 5:
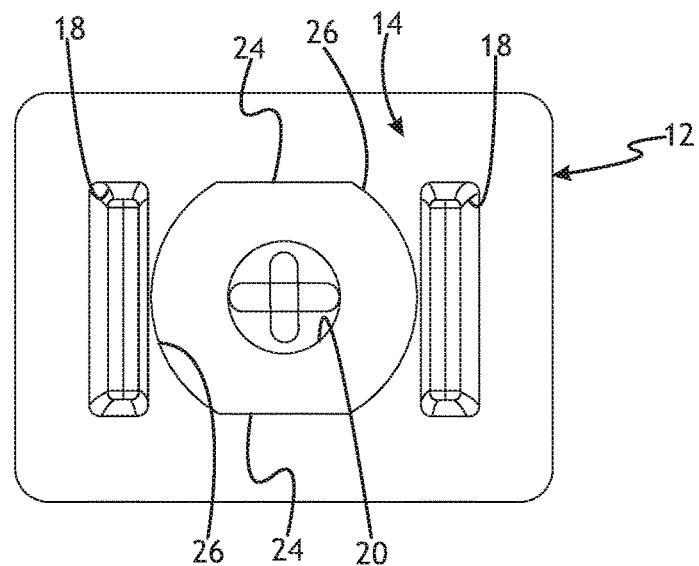
FIG. 5 is a bottom view of an embodiment of a locating block.

The locating block 12 further includes at least one positioning bore 18 extending from the first end 14 into the locating block 12 at a position offset from a center of the first end 14. In a preferred embodiment the locating block includes a first and a second positioning bores 18 as best seen in FIGS. 3 and 5. The first and second positioning bores 18 allows the locating block 14 to be positioned in one of two orientations. During assembly, only one of the positioning bores 18 will be used to position the locating block 12. The use of two positioning bores 18 allows the locating block 12 to be placed in either a first orientation or a second orientation. The second orientation is 180 degrees reversed from the first orientation. In this way, the positioning bores 18 make it easier to create the assembly 10, because the locating block 12 can be placed in either of two orientations and when in either orientation, the locating block 12 will be in the same position relative to a base member 28. The locating block 12 further includes an attachment bore 20 extending from the first end 14 which allows the attachment mechanism 10 to be attached to a center check as will be discussed below. In a preferred embodiment, the attachment bore 20 extends from the center of the first end 14. Each of the positioning bores 18 is offset an equidistance from the attachment bore 20; and therefore, each of the positioning bores 18 is offset from the center of the first end 14.

Figure 4:
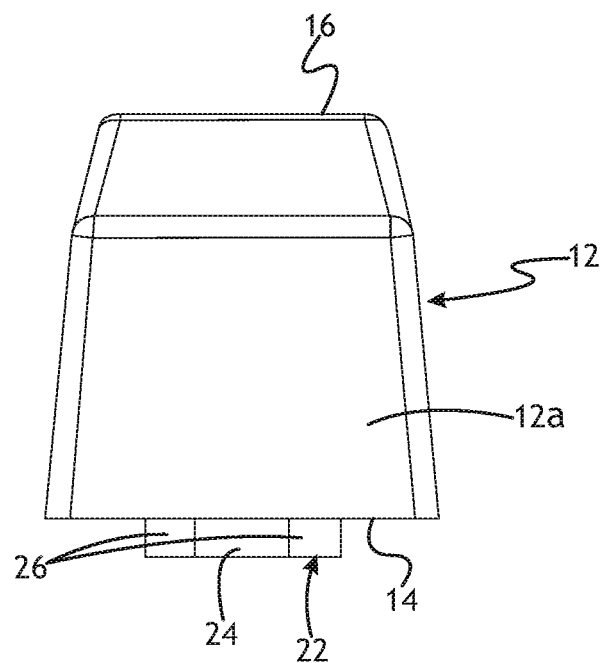
FIG. 4 is a side view of an embodiment of a locating block.

As best seen in FIGS. 4 and 5, the first end 14 of the locating block 12 includes an extension or keyed portion generally indicated at 22. The extension 22 extends from the first end 14 of the locating block 12. The extension 22 comprises a shape that allows the extension 22 to be positioned relative to the base member 28. In one embodiment, the extension or keyed portion 22 includes a pair of flat surfaces 24 and a pair of arcuate surfaces 26. Each of the flat surfaces 24 are opposed to each other and each of the arcuate surfaces 26 are opposed to each other.

Figure 2:
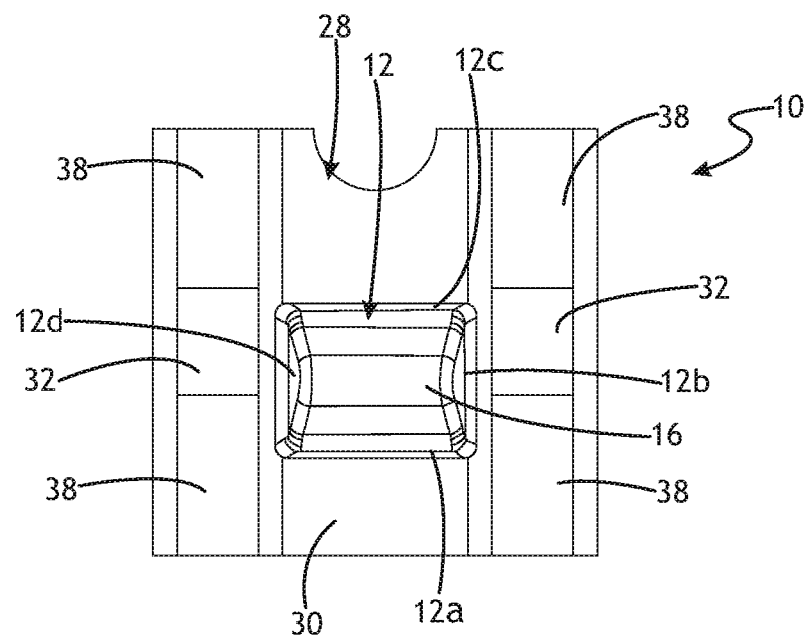
FIG. 2 is a top view of the embodiment of FIG. 1.
Figure 6:
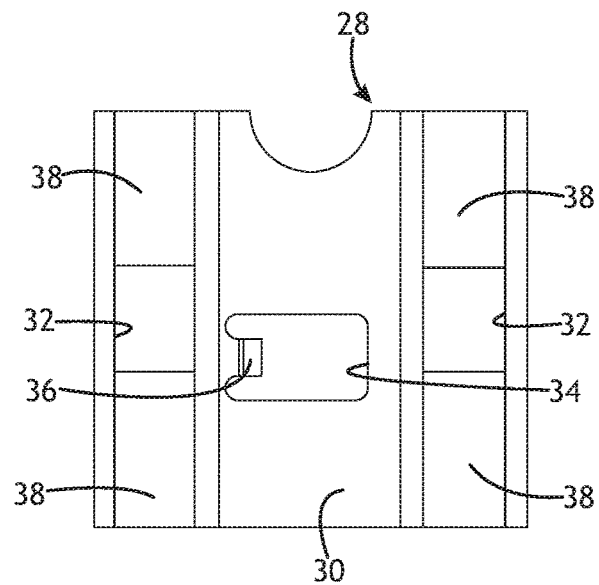
FIG. 6 is a top view of an embodiment of a base member.
Figure 7:
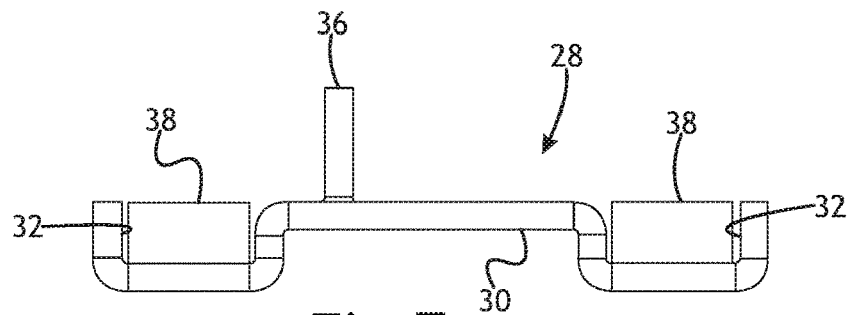
FIG. 7 is an end view of an embodiment of a base member.

The attachment mechanism 10 further comprises a base member generally indicated at 28 defining a center portion 30 and at least one trough 32 adjacent an edge of the center portion 30. In one embodiment and as best seen in FIGS. 2, 3 and 6, the attachment mechanism 10 comprises first and second troughs 32, the first trough 32 disposed along a first edge of the center portion and the second trough 32 disposed along a second edge of the center portion 30. In one embodiment, the base member 28 comprises metal. It will be appreciated, however that the base member 28 may comprise any suitable material.

The base member 28 includes at least one opening 34 through the center portion 30 thereof. The base member 28 further includes an upstanding leg 36 extending from the center portion 30 adjacent the opening 34.

Figure 8:
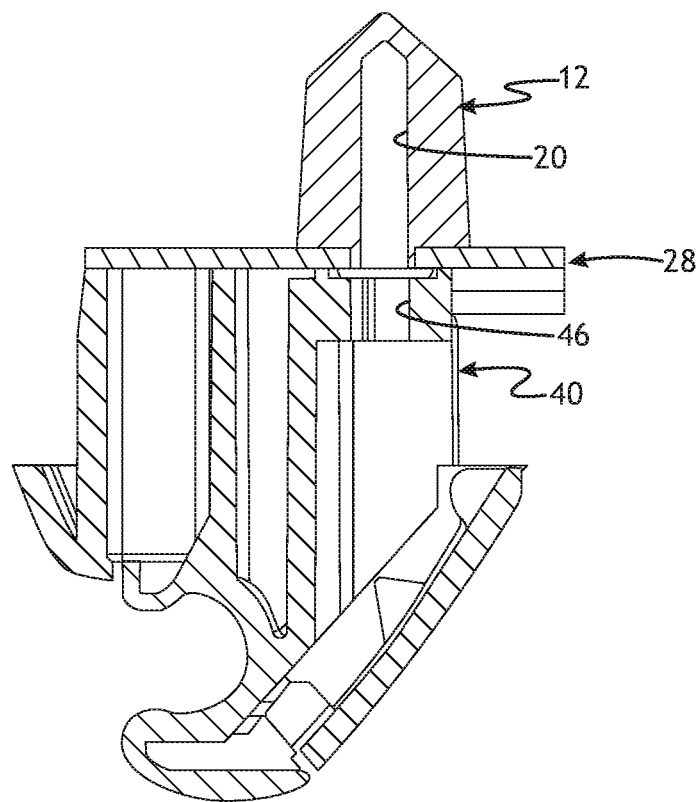

The attachment mechanism 10 includes at least one magnet 38 disposed in one of the first or second troughs 32 on the base member 28. In one embodiment two magnets 38 are disposed in each of the first and the second troughs 32. The magnets 38 are disposed with the ends facing one another, but may be spaced from one another, as best seen in FIGS. 2 and 6. In one embodiment, the magnets 38 are neodymium magnets. The magnets 38 may be secured to the base member 28 within the troughs 32 with a suitable adhesive. One such adhesive which may be used is Locktite 326. The magnets 38 are positioned to land on a flat sheet metal portion of the header surrounding the locating block. The magnets 38 are positioned within the troughs 32 such that the magnets are near flush with the bottom of the center check generally shown at 40 as best seen in FIG. 8.

As set forth above, the attachment mechanism 10 is used to help secure a vehicle headliner 44 to a vehicle header (not shown). The attachment mechanism 10 is assembled by orienting the locating block 12 with respect to the base member 28. The magnets 38 are placed in spaced relationship with each trough 32 and secured thereto as shown in the Figures and discussed above. To orient the locating block 12 relative to the base member 28, the locating block 12 is positioned such that the one of the positioning bores 18 receives the upstanding leg 36 of the base member 28 as best seen in FIG. 3. As is evident from FIG. 3, the locating block 12 could also be positioned 180 degrees reversed from that shown with the upstanding leg 36 then inserted into the other of the positioning bores 18. The extension or keyed portion 22 of the locating block 12 is inserted into the opening 34 in the base member 28. The flat surfaces 24 of the extension 32 are positioned into the opening 34 such that the flat surfaces 24 are in close proximity to the sidewall of the opening 34. With the locating block 12 positioned in this manner, twisting movement of the locating block 12 relative to the base member 28 is inhibited. While the extension or keyed portion 22 of the locating block passes through the opening 34 in the base member 28, the remainder of the locating block 12 is supported by the center portion 30 of the base member 28. Further, the use of the positioning bores 18, upstanding leg 36 and the keyed portion 22 all aid in orienting the locating block 112 in the proper position relative to the base member 28.

The upstanding leg may also serve to hold the base member 28 and locating block 12 together before the attachment mechanism 10 is connected to the center check 40, such as during shipping or at any time until the locating block 12 having the base member 28 thereon is fastened with the center check 40 at final assembly. The positioning bores 18 in the locator block 1A may be undersized for the thickness of the upstanding leg 36 by an amount to create a press fit therebetween.

In one embodiment, the locating block 14 is positioned off center of the magnets 38 (in the fore and aft or longitudinal direction of the base member 28) to allow the magnets 38 to optimally land on the flat sheet metal surrounding the locating block.

The locating block 12 extends from the center portion 30 of the base member 28. The magnets 38 are disposed in the trough and adapted to connect with the header of the vehicle. The locating block 12 is adapted to position the attachment mechanism relative to the header and the magnets are adapted to retain the locating block and base member in position on the header. In one embodiment, the magnets 38 provide typically more than 100 N of holding force in the normal direction when placed on a header that comprises 1.2 mm sheet metal—which is commonly used in vehicles.

Figure 9:
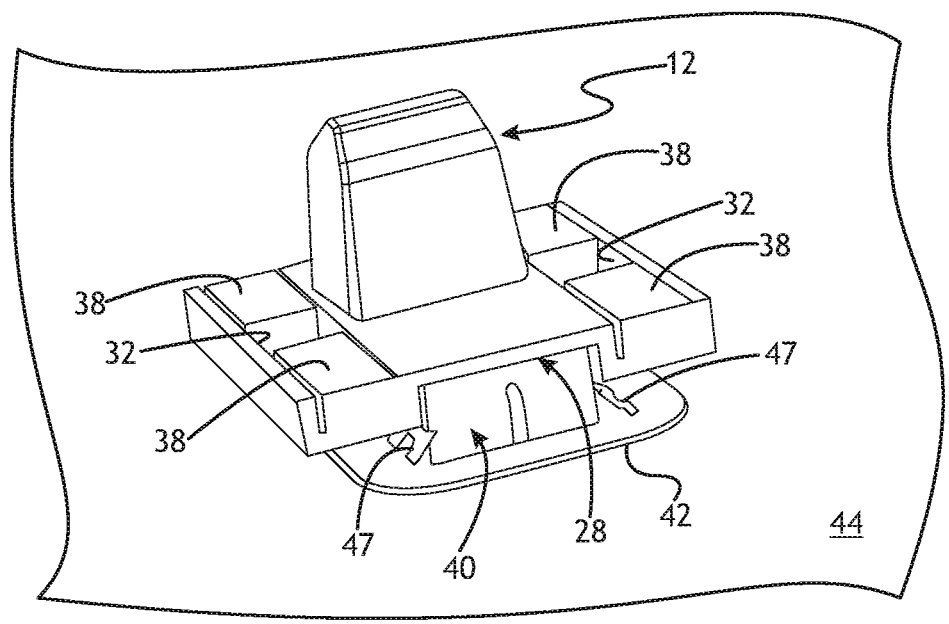
FIG. 9 is a perspective view showing the embodiment of FIG. 1 coupled with a center check and showing a vehicle headliner.

FIG. 9 shows the attachment mechanism 10 secured to the center check which is generally indicated at 40. A portion of the center check 40 is inserted through an opening in the vehicle headliner 44. The portion of the center check 40 is therefore disposed on the back side of the headliner 44 with the remainder of the center check 40 on the front side of the headliner, and is therefore not visible in FIG. 9. A retainer 42 is press fit onto the portion of the center check that is protruding through the back side of the headliner. The retainer 42 contains locking tabs 47 that are positioned at an angle to allow the retainer 42 to be press fit over the center check 40. The locking tabs 47 prevent the retainer 42 from easily being removed from the center check 40. Once the center check is inserted fully through the opening in the front side of the headliner 44 and the retainer 42 is press fit onto the center check from the from the back side of the headliner, the retainer 42 prevents the center check 40 from falling back through the opening in the headliner. At this point, the center check 40 is ready to be connected to the attachment mechanism.

As best seen in FIG. 8, the center check 40 has a bore 46 therethrough which is axially aligned with the attachment bore 20 in the locating block 12. A suitable fastener such as a screw (not shown) is inserted through the bore 46 in the center check 40 and into the attachment bore 20 to secure the center check 40 with the locating block 12, and therefore, the attachment mechanism 10. The extension or keyed portion 22 inhibits twisting movement of the locating block 12 relative to the base member 28 while the center check 40 is being secured to the locating block 12 of attachment mechanism 10.

Once the attachment mechanism 10 is secured with the center check 40, the headliner 44 having the completed assembly thereon is ready to be attached to the vehicle header (not shown). An installer would lift the headliner assembly having the attachment mechanism 10 and center check 40 until the locating block 12 is positioned against the hole in the header to which the attachment mechanism 10 will be secured. The tapered sides of the locating block 12 help the locating block 12 to be positioned in the precisely located opening in the vehicle header. When the magnets 38 secured in the troughs 32 are in close proximity to the vehicle header, the magnets 38 actually aid the installer in fixing the vehicle headliner 44 to the vehicle header. The use of the attachment mechanism minimizes if not eliminates any installation force above the weight of the headliner necessary with prior systems. This is because the attachment mechanism will begin to lift the headliner into its final position at a distance of approximately 0.25 inches from its final position. The attachment mechanism 10 may also provide an audible indication, or click, when the magnets 28 engage the vehicle header, signaling to the installer that the attachment mechanism having the center check 40 thereon is properly positioned. The small clearance between the locating block 12 and opening in the vehicle header is preferred because the positioning of the driver's side center check 40 is paramount. The driver's side center check 40, also known as a 4 way locater, when properly positioned provides the reference point for other features as they are attached to the vehicle.

Use of the attachment mechanism of one of the embodiments disclosed above offers significant improvements to the installation of the 4-way locator by at least greatly simplifying the process and reducing operator fatigue. Further the use of the attachment mechanism serves as an assembly aid in that reduces the installation forces required to install the headliner and also holds up the entire front of the headliner leaving both hands of the installers free to install the passenger side 4 way and the two outboard visor screw clips The attachment mechanism 10 can be adapted for vehicles having different dimensioned openings in the header by adjusting the dimensions of the locating block 12.

This is an illustrative description of an embodiment the invention using words of description rather than of limitation. Obviously, many variations and modifications of the present embodiment are possible in light of the above teachings and one may practice the invention other than as specifically described.

What is claimed is:

1. An attachment mechanism adapted for use to connect a vehicle headliner with a vehicle header comprising:
    a locating block adapted to be inserted into an opening in the header of a vehicle;
    a base member defining a center portion and at least one trough adjacent an edge of the center portion, the locating block extending from the center portion of the base member;
    the base member including at least one opening through the center portion of the base member;
    at least one magnet disposed in the trough and adapted to connect with the header of the vehicle;
    wherein, the locating block is adapted to position the attachment mechanism relative to the header and the magnet is adapted to retain the locating block and base member in position on the header.

2. The attachment mechanism as set forth in claim 1 further comprising an upstanding leg extending from the center portion of the base member adjacent the opening.

3. The attachment mechanism as set forth in claim 2 further comprising first and second troughs, the first trough disposed along a first edge of the center portion and the second trough disposed along a second edge of the center portion at least one magnet is disposed in each of the first and second troughs.

4. The attachment mechanism as set forth in claim 3 further comprising at least two magnets disposed in each of the first trough and the second trough, the two magnets in each trough being spaced from one another in a longitudinal direction of the base member and defining a center therebetween.

5. The attachment mechanism as set forth in claim 3 wherein the center portion of the base member is generally rectangular and has first and second ends, the opening through the center portion is offset in the longitudinal direction from a center between the magnets in each trough.

6. The attachment mechanism as set forth in claim 4 wherein the locating block includes four sides and extends from a first end to a second end, each of the sides tapers at the second end thereof.

7. The attachment mechanism as set forth in claim 6 wherein the locating block includes at least one positioning bore extending from the first end into the locating block at a position offset from a center of the first end and adapted to be positioned on the upstanding leg.

8. The attachment mechanism as set forth in claim 7 wherein the locating block includes a first positioning bore and a second positioning bore extending from the first end and into the locating block, each of the first and second positioning bores are offset from a center of the first end.

9. The attachment mechanism as set forth in claim 7 wherein the first end of the locating block includes an extension that is adapted to be retained in the opening of the base, the extension comprises a shape that allows the extension to be positioned into the opening and prevents relative twisting motion between the locating block and the center portion of the base member.

* * * * *